United States Patent
Bruce et al.

(10) Patent No.: US 11,494,794 B1
(45) Date of Patent: *Nov. 8, 2022

(54) ESTIMATING THE COST OF RESIDENTIAL REMODELING PROJECTS

(71) Applicant: Zillow, Inc., Seattle, WA (US)

(72) Inventors: Andrew Bruce, Seattle, WA (US); Kristin Acker, Lake Forest Park, WA (US); Luis Enrique Poggi, Seattle, WA (US); Chunyi Wang, Seattle, WA (US); Alexander Kutner, Seattle, WA (US); Ben Schielke, Shoreline, WA (US)

(73) Assignee: Zillow, Inc., Seattle, WA (US)

( * ) Notice: Subject to any disclaimer, the term of this patent is extended or adjusted under 35 U.S.C. 154(b) by 620 days.

This patent is subject to a terminal disclaimer.

(21) Appl. No.: 16/445,699

(22) Filed: Jun. 19, 2019

Related U.S. Application Data

(63) Continuation of application No. 13/841,413, filed on Mar. 15, 2013, now Pat. No. 10,332,138, which is a continuation of application No. 13/799,235, filed on Mar. 13, 2013, now abandoned.

(60) Provisional application No. 61/761,153, filed on Feb. 5, 2013.

(51) Int. Cl.
  *G06Q 30/02*  (2012.01)

(52) U.S. Cl.
  CPC .............................. *G06Q 30/0206* (2013.01)

(58) Field of Classification Search
  None
  See application file for complete search history.

(56) References Cited

U.S. PATENT DOCUMENTS

| | | | |
|---|---|---|---|
| 398,406 | A | 2/1889 | Johnson |
| 4,964,060 | A | 10/1990 | Hartsog |
| 5,189,606 | A | 2/1993 | Burns et al. |
| 5,668,736 | A | 9/1997 | Douglas et al. |
| 5,761,674 | A | 6/1998 | Ito |
| 5,893,082 | A | 4/1999 | McCormick |
| 5,918,219 | A | 6/1999 | Isherwood |
| 6,446,053 | B1 | 9/2002 | Elliott |
| 6,996,503 | B2 | 2/2006 | Jung |
| 7,254,553 | B2 | 8/2007 | Fogelson |
| 7,283,975 | B2 | 10/2007 | Broughton |
| 7,752,065 | B2 | 7/2010 | Buzz |
| 7,783,523 | B2 | 8/2010 | Lopez et al. |
| 7,844,503 | B2 | 11/2010 | Fogelson |
| 8,001,160 | B2 | 8/2011 | Weisflog |
| 8,065,123 | B2 | 11/2011 | Wood |
| 8,510,196 | B1 | 8/2013 | Brandmaier et al. |

(Continued)

OTHER PUBLICATIONS

Consultants Estimating Manual Division of Capital Asset Management, Commonwealth of Massachusetts, Feb. 2006.

(Continued)

*Primary Examiner* — Leland Marcus
(74) *Attorney, Agent, or Firm* — Perkins Coie LLP

(57) ABSTRACT

A facility for estimating the cost of a remodeling project is described. The facility accesses a project cost model that predicts project costs determined from a photograph based upon project characteristics. The facility applies the access project cost model to characteristics of a distinguished project to obtain an estimated cost. The facility causes the obtained estimated cost to be displayed.

49 Claims, 9 Drawing Sheets

(56) References Cited

U.S. PATENT DOCUMENTS

| | | | |
|---|---|---|---|
| 8,706,646 | B2 | 4/2014 | Jannott et al. |
| 8,712,893 | B1 | 4/2014 | Brandmaier et al. |
| 8,731,234 | B1 | 5/2014 | Ciarcia et al. |
| 8,923,551 | B1 | 12/2014 | Grosz et al. |
| 9,605,704 | B1 | 3/2017 | Humphries et al. |
| 10,332,138 | B1 * | 6/2019 | Bruce ............... G06Q 30/0206 |
| 2001/0025229 | A1 | 9/2001 | Moritz et al. |
| 2001/0032062 | A1 | 10/2001 | Plaskoff et al. |
| 2001/0039506 | A1 | 11/2001 | Robbins |
| 2001/0047250 | A1 | 11/2001 | Schuller et al. |
| 2002/0087389 | A1 | 7/2002 | Sklarz et al. |
| 2002/0099725 | A1 | 7/2002 | Gordon |
| 2002/0116163 | A1 | 8/2002 | Loveland |
| 2002/0120554 | A1 | 8/2002 | Vega |
| 2003/0028393 | A1 | 2/2003 | Coulston et al. |
| 2003/0171957 | A1 | 9/2003 | Watrous |
| 2004/0054568 | A1 | 3/2004 | Bradley et al. |
| 2004/0186763 | A1 | 9/2004 | Smith |
| 2004/0193474 | A1 | 9/2004 | Digiacomo |
| 2005/0071376 | A1 | 3/2005 | Modi |
| 2005/0081161 | A1 | 4/2005 | MacInnes et al. |
| 2005/0187778 | A1 | 8/2005 | Mitchell |
| 2006/0155571 | A1 | 7/2006 | Almeida et al. |
| 2007/0027564 | A1 | 2/2007 | Walters |
| 2007/0061774 | A1 | 3/2007 | Chan et al. |
| 2007/0073610 | A1 | 3/2007 | Marugabandhu et al. |
| 2008/0103908 | A1 | 5/2008 | Munk |
| 2008/0255914 | A1 | 10/2008 | Oren |
| 2008/0262789 | A1 | 10/2008 | Pershing et al. |
| 2009/0006185 | A1 | 1/2009 | Stinson |
| 2009/0132436 | A1 | 5/2009 | Pershing et al. |
| 2009/0174768 | A1 | 7/2009 | Blackburn et al. |
| 2009/0265193 | A1 | 10/2009 | Collins et al. |
| 2010/0110074 | A1 | 5/2010 | Pershing |
| 2010/0161495 | A1 | 6/2010 | Olson et al. |
| 2010/0211421 | A1 | 8/2010 | Sciammarella et al. |
| 2012/0101783 | A1 | 4/2012 | Stephens et al. |
| 2013/0211790 | A1 | 8/2013 | Loveland et al. |
| 2014/0012720 | A1 | 1/2014 | O'Kane |
| 2014/0095122 | A1 | 4/2014 | Appleman et al. |
| 2014/0222608 | A1 | 8/2014 | Cohen et al. |
| 2014/0229212 | A1 | 8/2014 | MacElheron et al. |
| 2014/0257924 | A1 | 9/2014 | Xie et al. |
| 2014/0279692 | A1 | 9/2014 | Boothby et al. |
| 2015/0088766 | A1 | 3/2015 | Krause |
| 2015/0186953 | A1 | 7/2015 | Gross |

OTHER PUBLICATIONS

Crook, Jordan, Redbeacon Home Services Marketplace Launches Android App, Refocuses on Mobile Techcrunch.com, Oct. 22, 2012.
Eaton, Kit, Guiding D.I.Y Home Repairs or Summoning the Pros The New York Times, Nov. 28, 2012.
Final Office Action for U.S. Appl. No. 13/828,680, dated Jul. 11, 2018, 59 pages.
Final Office Action in U.S. Appl. No. 13/841,413, dated Oct. 15, 2015, 26 pages.
Final Office Action in U.S. Appl. No. 14/721,437, dated Nov. 9, 2018, 84 pages.
Fischer, Evan, Handy Man DIY Practically Rennovates for You Pocketfullofapps.com, Jun. 19, 2012.
Graphisoft Constructur 2005 Tutorial Graphisoft, 2005, pp. 1-52.
HomeTechOnline.com Web Pages Hometech, May 2000, Retrieved from Archive.org Feb. 22, 2007.
Laird, N.M. et al., "Random-Effects Models for Longitudinal Data," Biometrics, Dec. 1982, vol. 38, No. 4, pp. 963-974, 13 pages.
Mccullagh, P. et al., Generalized Linear Models, Chapman and Hall, 1989, 511 pages. Book to be mailed to USPTO.
Non-Final Office Action in U.S. Appl. No. 13/841,413, dated Dec. 15, 2017, 17 pages.
Non-Final Office Action in U.S. Appl. No. 13/841,413, dated Jan. 9, 2015, 21 pages.
Non-Final Office Action in U.S. Appl. No. 13/841,413, dated Jun. 23, 2016, 25 pages.
Non-Final Office Action in U.S. Appl. No. 13/841,413, dated May 8, 2015, 21 pages.
Non-Final Office Action in U.S. Appl. No. 14/721,437, dated Dec. 18, 2017, 52 pages.
Notice of Allowance in U.S. Appl. No. 13/841,413, dated Feb. 21, 2019, 8 pages.
Phaobunjong, Kan, Parametric Cost Estimating Model for Conceptual Cost Estimating of Building Construction Projects The University of Texas at Austin, May 2002, 219 pages.
Pinheiro, J. C. et al., Mixed-Effects Models in S and S-PLUS, New York: Springer, 2000, 528 pages. Book to be mailed to USPTO.
Rao, Leena, Home Services Marketplace Redbeacon Launches iPhone App to Get Quotes on the Go Techcrunch.com, Nov. 9, 2011.
Readyratios.com, Cost Approach to Value, https://www.readyratios.com/reference/appraisal/cost approach to value.html, archived on Jul. 16, 2013, https://web.archive.org/web/20130716153950/https://www.readyratios.com/reference/appraisal/cost_approach_to_value.html, viewed Oct. 30, 2018, p. 1 (Year: 2013).
Redbeacon launches at Techcrunch50 Techcrunch, Sep. 14, 2009.
Redbeacon.com web pages—How it works Redbeacon.com, Dec. 2011, Retrieved from Archive.org Jan. 6, 2015, pp. 1-15.
Redbeacon.com web pages, "Home Services Done Right." Redbeacon.com, May 2012, Retrieved from Archive.org Jan. 6, 2015, pp. 1-33.
Venables, W. N. et al., Modern Applied Statistics with S, New York: Springer, 2002, 495 pages. Book to be mailed to USPTO.
U.S. Appl. No. 14/721,437 for Humphries, filed May 26, 2015.
U.S. Appl. No. 13/828,680 for Humphries, filed Mar. 14, 2013.
Final Office Action in U.S. Appl. No. 14/721,437, dated Apr. 16, 2020, 107 pages.
Non-Final Office Action in U.S. Appl. No. 14/721,437, dated Jan. 4, 2021, 72 pages.
Notice of Allowance in U.S. Appl. No. 14/721,437, dated Apr. 14, 2021, 13 pages.
Remodeling Magazine, Remodeling Cost vs Value Report 2006, Hanley Wood LLC, pp. 1-6.

* cited by examiner

| Category | Contractor A | | Contractor B | | Contractor C | | Contractor D | |
|---|---|---|---|---|---|---|---|---|
| | Labor | Materials | Labor | Materials | Labor | Materials | Labor | Materials |
| Demolition | 640 | 250 | 288 | 400 | 2240 | 2750 | 720 | 900 |
| Counters | 4320 | 2880 | 2052 | 1368 | 1980 | 1320 | 918 | 612 |
| Backsplash | 450 | 480 | 945 | 630 | 1440 | 1237.5 | 1200 | 1280 |
| Appliances | 790 | 10150 | 680 | 5042.5 | 1192.5 | 21725 | 750 | 6902.5 |
| Flooring | 1365 | 1365 | 480 | 540 | 880 | 3300 | 2100 | 2100 |
| Drywall | 948 | 632 | 612 | 408 | 861.3 | 574.2 | 528 | 352 |
| ... | | | | | | | | |

*FIG. 7*

ESTIMATING THE COST OF RESIDENTIAL REMODELING PROJECTS

CROSS-REFERENCE TO RELATED APPLICATION(S)

This application is a continuation of U.S. application Ser. No. 13/841,413, filed on Mar. 13, 2013, which is a continuation of U.S. application Ser. No. 13/799,235, filed on Mar. 13, 2013, which claims priority from U.S. Provisional Patent Application No. 61/761,153, filed on Feb. 5, 2013, the contents of each of which are expressly incorporated by reference herein.

TECHNICAL FIELD

The described technology is directed to the field of automated real estate information tools.

BACKGROUND

Among homeowners, it is common to hire a contractor to "remodel" a room, by doing work to improve the condition, style, and/or functionality of the room.

Conventionally, a homeowner determines the approximate cost of a particular remodeling project by consulting with one or more contractors, who come to the home, view the room, learn from the homeowner how the room is to be changed in the remodeling project, and generate an estimate that includes an estimated total cost for them to perform the remodeling project.

BRIEF DESCRIPTION OF THE DRAWINGS

FIG. 7 is a table diagram showing estimates performed by different contractors for different aspects of a project to be used as an observation to train the facility's model.

DETAILED DESCRIPTION

Figure 1:
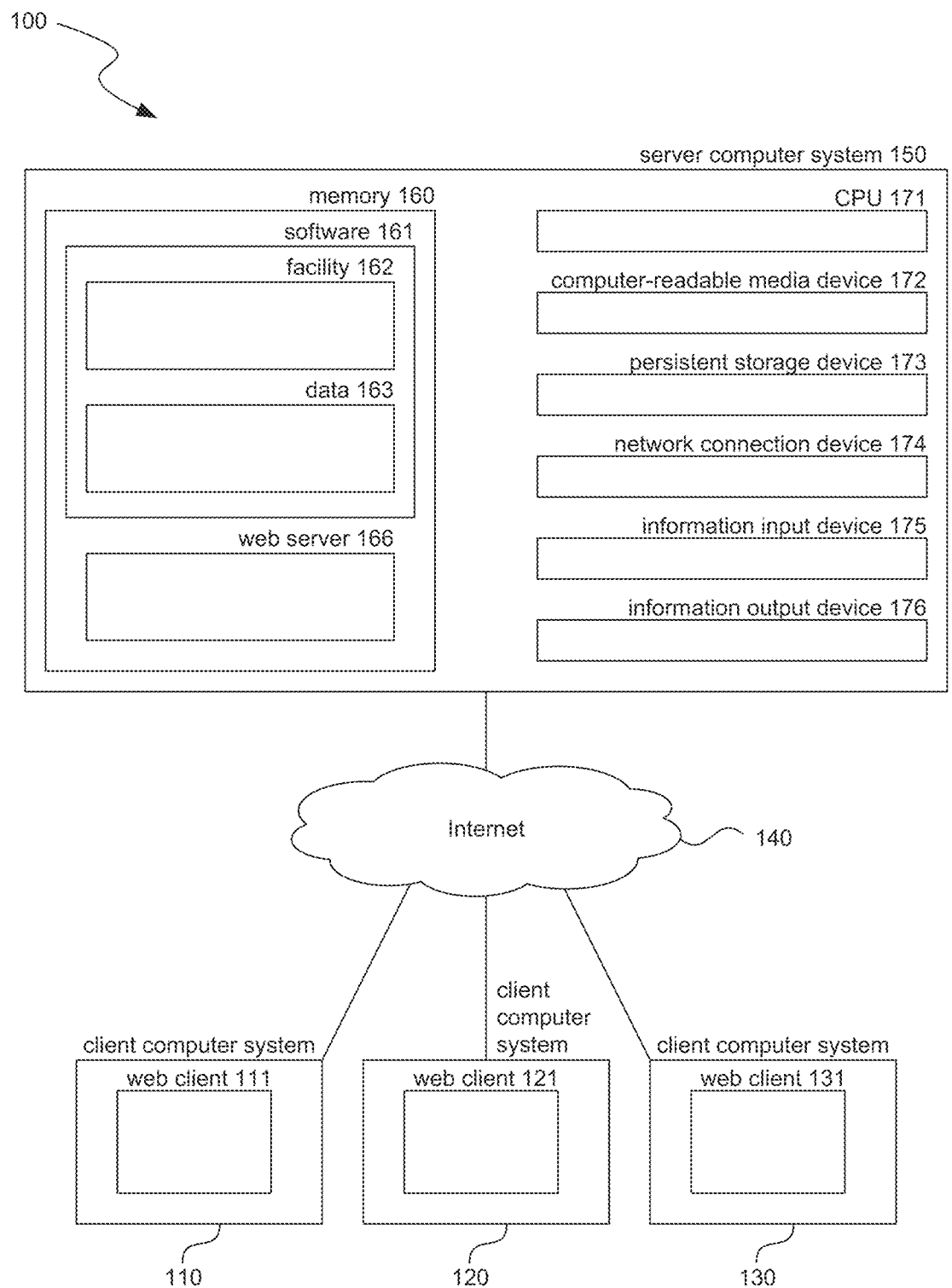
FIG. 1 is a high-level block diagram showing a typical environment in which a software, hardware, and/or firmware facility implementing the functionality described herein operates in some embodiments.

The inventors have recognized that the conventional approach to estimating the cost of a remodeling project has significant disadvantages. It typically takes the homeowner substantial effort to identify contractors who are likely to do good work, contact them, make arrangements for a home visit, review with them their detailed ideas for the remodeling project, and understand and synthesize the bids prepared by each contractor.

Accordingly, the inventors have conceived a software and/or hardware facility for estimating the cost of a remodeling project with less effort on the part of the homeowner ("the facility"). In some embodiments, the facility receives information about sample completed remodeling projects; this information includes photographs of the remodeled room after remodeling, as well as information about the actual cost of the project and an indication of the date on which and geographic location in which the project was performed. The facility subjects the photos from each project to a visual analysis process that discerns from the visual information in the photos characteristics of the project that have a relationship to the cost of the project, such as attribute values (e.g., project type=kitchen, number of cabinet doors=12), tags (e.g., #island), and/or an overall quality score for the project (e.g., quality=8). In various embodiments, the visual analysis process involves, for example, having a team of human editors discern the project's characteristics and attribute them to the project, having an automatic visual analysis system discern and attribute the project's characteristics, etc. Together, a project's characteristics, its cost, its date, and its geographic location comprise an observation. These observations are used to train a model that predicts, in a way that is sensitive to geographic location, the cost of a project based on its characteristics.

The facility proceeds to use the trained model to estimate the cost of additional projects. A user such as a homeowner can provide, such as by uploading to a web site, photos of a room that represent the completed state of a remodeling project contemplated by the user, together with an indication of the geographic location in which the project would be performed. For example, these photos may be obtained from a catalog, taken by the user or otherwise obtained from a sample house, etc., that reflect the user's vision for the project. These photos are subjected to the same visual analysis process as the photos used in the observations, to similarly discern characteristics of the project. The model is then applied to these discerned characteristics, together with the geographic location specified by the user, to obtain an estimated cost of performing this project in the specified location. In some embodiments, the facility causes the obtained estimated cost of performing the project to be included in a web page served for the project, such as one that includes one or more of the photos, the project's characteristics, and the geographic location and date for which the cost of the project was estimated.

In some embodiments, in addition to or instead of being based on projects completed by the model contractors, the facility bases the model on bids prepared for projects by contractors as contrasted with the actual cost of projects. In some embodiments, the facility generates observations and trains its model in a manner that is insensitive of the identity of the contractor or other person providing a cost for the observation project. In other embodiments, however, the model is trained with observations in a manner that is sensitive to the identity of the contractor who provided the cost for the observation, such that the trained model can estimate the cost of a new project based upon a blend of costs expected to be attributed by the different contractors who provided costs for observations used to train the model.

In some embodiments, the facility trains and applies an attribute value imputation model to impute values for attributes for a project that do not have values. In various embodiments, such imputation is performed for observation projects, projects to be estimated, or both.

By performing in some or all of the ways described above, the facility estimates the cost of residential remodeling projects with significantly less effort on the part of the homeowner or other requester of the estimate than conventional approaches.

FIG. 1 is a high-level block diagram showing a typical environment in which a software, hardware, and/or firmware facility implementing the functionality described herein operates in some embodiments. The environment 100 includes a server computer system 150. The server computer system 150 includes a memory 160. The memory 160 includes software 161 incorporating both the facility 162 and data 163 typically used by facility. The memory further includes a web server computer program 166 for providing web pages and/or other information to other computers. While items 162 and 163 are stored in memory while being used, those skilled in the art will appreciate that these items, or portions of them, maybe be transferred between memory and a persistent storage device 173 for purposes of memory management, data integrity, and/or other purposes. The server computer system 150 further includes one or more central processing units (CPU) 171 for executing programs, such as programs 161, 162, and 166, and a computer-readable medium drive 172 for reading information or installing programs such as the facility from tangible computer-readable storage media, such as a floppy disk, a CD-ROM, a DVD, a USB flash drive, and/or other tangible computer-readable storage media. The computer system 150 also includes one or more of the following: a network connection device 174 for connecting to a network (for example, the Internet 140) to exchange programs and/or data via its networking hardware, such as switches, routers, repeaters, electrical cables and optical fibers, light emitters and receivers, radio transmitters and receivers, and the like, an information input device 175, and an information output device 176. In some embodiments, the facility operates on the server computer system to perform some or all of the following activities: receive information about observations used to train the model; training the model using observations; receiving information about projects whose cost is to be estimated; and applying the model to estimate the cost of these projects.

The block diagram also illustrates several client computer systems, such as client computer systems 110, 120, and 130. Each of the client computer systems includes a web client computer program, such as web clients 111, 120, and 131, and/or mobile or desktop client application programs (not shown) for receiving web pages and/or other information in response to requests to web server computer programs, such as web server computer program 166. The client computer systems are connected via the Internet 140 or a data transmission network of another type to the server computer system 150. Those skilled in the art will recognize that the client computer systems could be connected to the server computer system 150 by networks other than the Internet, however. In some embodiments, some or all of the client computer systems are used to complete a survey. In some embodiments, these client computer systems can include other server computer systems, desktop computer systems, laptop computer systems, mobile phones, personal digital assistants, tablet computers, televisions, cameras, automobile computers, electronic media players, etc. In various embodiments, these client computer systems include various combinations of the components shown in server computer system 150.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
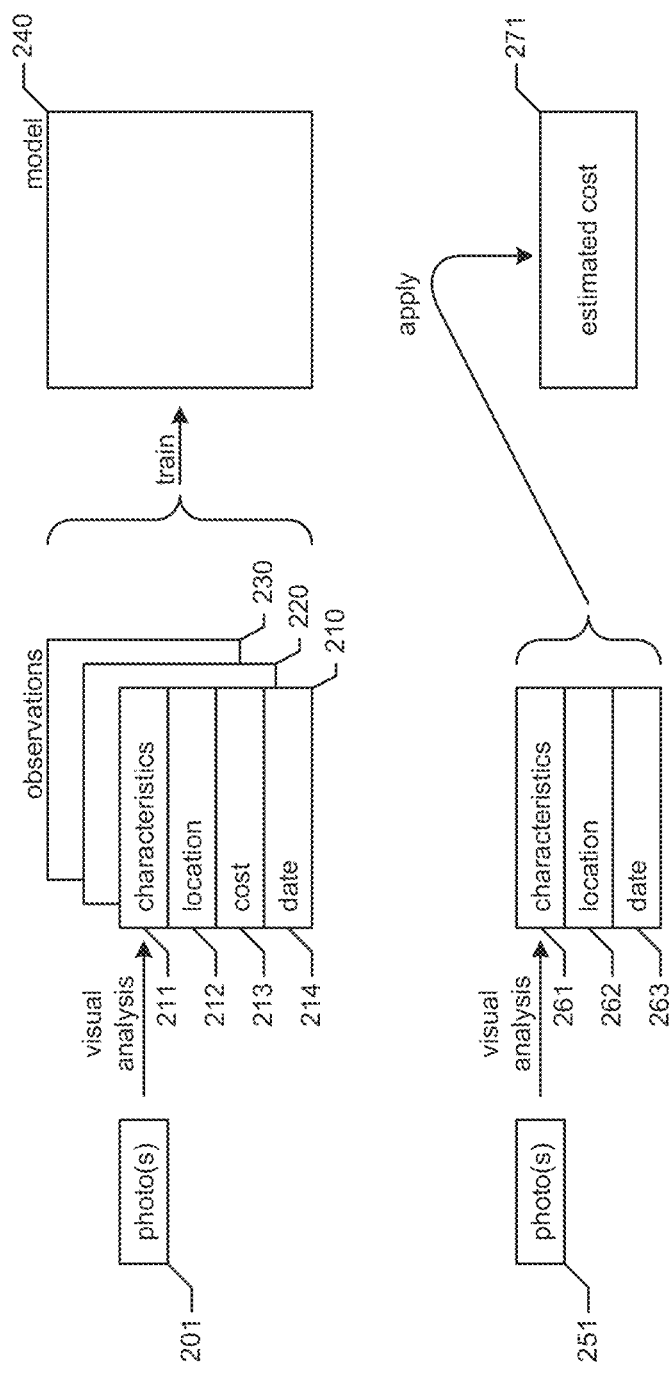
FIG. 2 is a data flow diagram showing how the facility estimates the costs of remodeling projects.

FIG. 2 is a data flow diagram showing how the facility estimates the costs of remodeling projects. The facility trains a model 240 on the basis of a number of observations 210, 220, and 230. This training is sometimes referred to as "fitting" the model. Each observation, such as observation 210, is comprised of a geographic location 212, a cost 213 manually estimated for performing the project at the location, a date 214 for which the cost of the project is estimated, and characteristics 211 of the project, determined by performing a visual analysis on one or more photos 201 depicting the end result of the project. As discussed in detail elsewhere herein, in some embodiments, an observation also includes information about how the cost 213 was determined, such as information identifying a contractor who either actually performed the project for the specified cost, or who estimated the specified cost for the project on the basis of the photos and/or characteristics.

Once the model 240 is trained in this way, it is used to determine estimated costs for proposed projects. For each such proposed project, one or more photos 251 depicting the end result of the project are subjected to the visual analysis process in order to produce characteristics of the proposed project. Also, a geographic location 262 is specified for the proposed project, as is a date 263. The facility proceeds to apply the model to these inputs in order to obtain an estimated cost 271 for the project. This application of the model is sometimes referred to as "scoring" the model.

Figure 3:
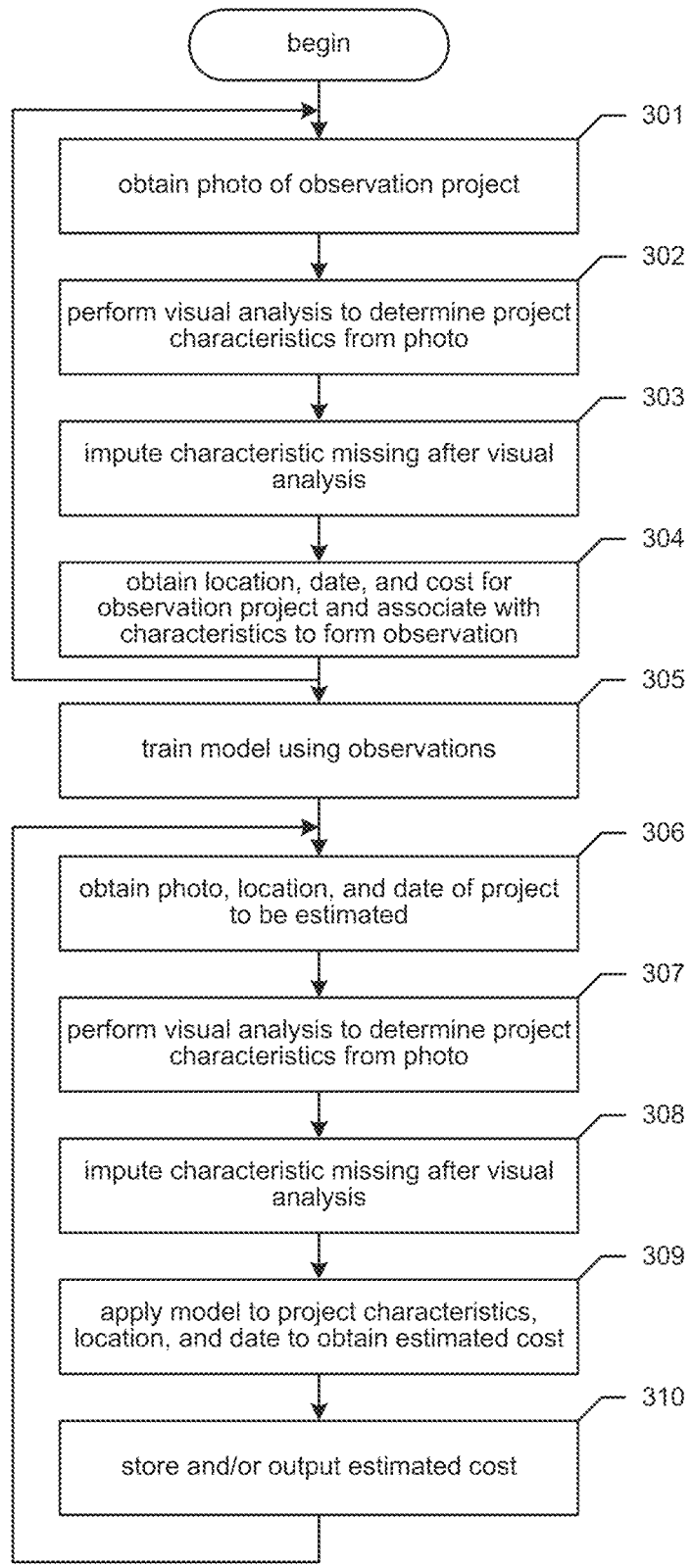
FIG. 3 is a flow diagraph showing steps typically performed by the facility in order to estimate the cost of remodeling projects.

FIG. 3 is a flow diagram showing steps typically performed by the facility in order to estimate the cost of remodeling projects. In step 301, the facility obtains one or more photos of a project to be used as an observation, that is, a project to be used to train the model.

Figure 4:
FIG. 4 is an image diagram showing a sample photo of a project to be used as an observation.

FIG. 4 is an image diagram showing a sample photo of a project to be used as an observation. This photo 400 shows the finished state of a remodel project for a kitchen. This photo is a basis for determining characteristics of the project including room dimensions, quality and/or expensiveness of the materials and labor, appliance presence and type, cabinet and finish count and type, etc.

Returning to FIG. 3, in step 302, the facility performs a visual analysis process to determine from the photo obtained in step 301 characteristics of the project that could bear a meaningful relationship to the cost of the project. In various embodiments, step 302 is performed using automated computer vision techniques and/or by soliciting project characteristic information from human users, such as editors, to whom the photograph is displayed.

Figure 5:
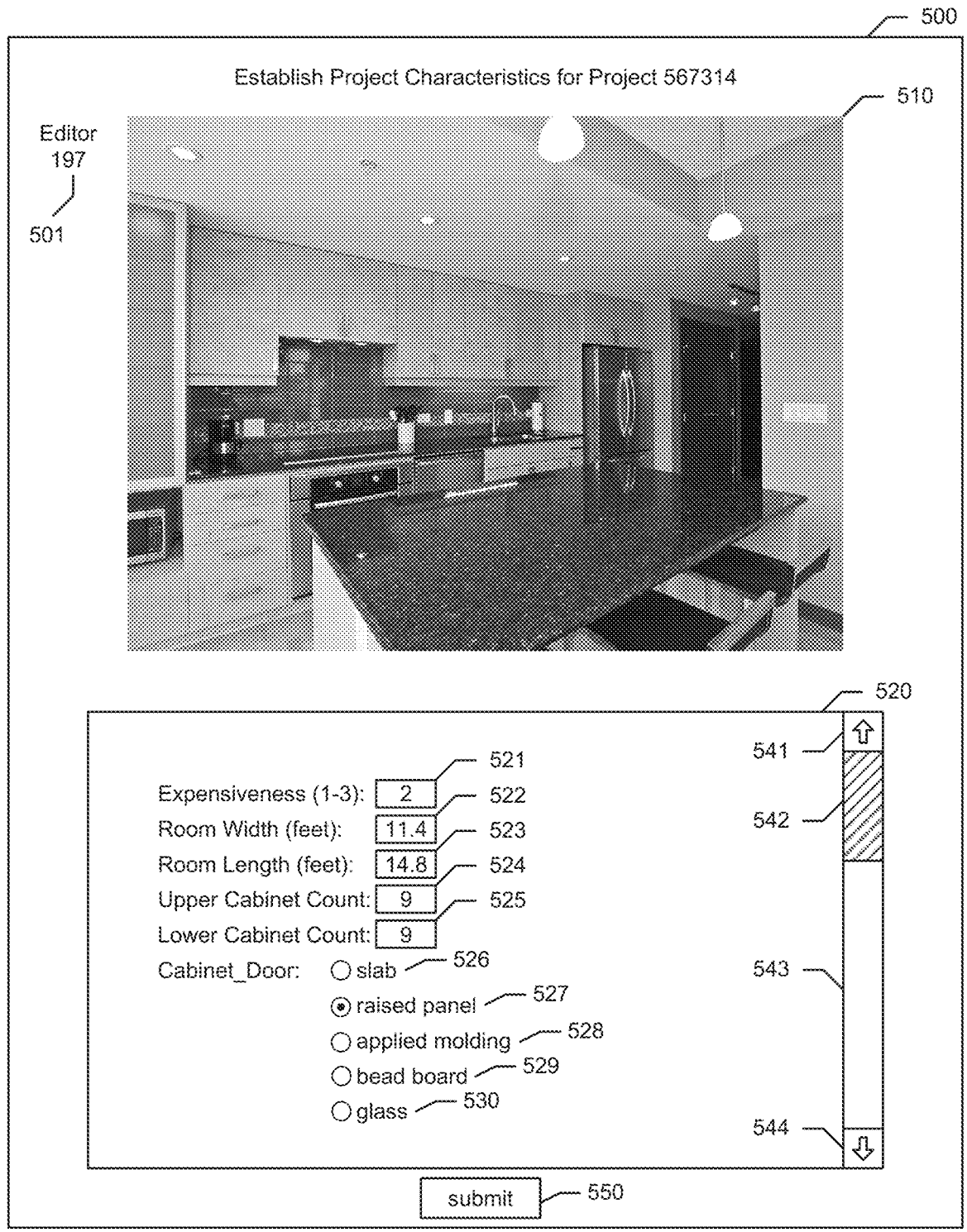
FIG. 5 is a display diagram showing a visual user interface presented by the facility in some embodiments in order to facilitate visual analysis by a human user to obtain characteristics of a sample project.

FIG. 5 is a display diagram showing a visual user interface presented by the facility in some embodiments in order to facilitate visual analysis by a human user to obtain characteristics of a sample project. The display 500 includes a copy 510 of the photograph received for the project shown in FIG. 4. It further includes a region 520 into which a human user inputs characteristics of the project portrayed in the photo. For example, it includes text entry fields 521-525 into which the user can enter values for five different project attributes. Region 400 further includes radio buttons 526-

530, one of which the user can select in order to specify one of five shown enumerated values for a Cabinet Door project attribute. The user can operate scrolling controls 541-544 to expose and complete the portion of region 520 that is hidden in the view shown. After doing so, the user activates a submit button 550 to submit the project characteristics entered into this area on behalf of the project whose photo is shown. With respect to both this display diagram and those described below, those skilled in the art will appreciate that a variety of different user interfaces may be used interchangeably to serve the purposes described.

A complete sample set of project characteristics entered for the sample observation projects is shown below in Table 1:

TABLE 1

Attribute Values For Observation Project

| attribute | attribute value |
|---|---|
| Expensiveness | 2 |
| Room Width | 11.41 |
| RoomLength | 14.81 |
| UpperCabinetCount | 9 |
| LowerCabinetCount | 9 |
| CABINET_DOOR | Raised Panel |
| CABINET_FRAME | Framed Partial Panel |
| COUNTERTOP_STONE | Granite-complex |
| BACKSPLASH_HEIGHT | Full |
| BACKSPLASH_TILE | Large Ceramic (6 × 6) |
| APPLIANCE_DISHWASHER | Dishwasher 24 |
| APPLIANCE_MICROWAVE | Built-In Microwave |
| APPLIANCE_BURNER | Gas Cook top 36" |
| APPLIANCE_OVEN | Double Wall Oven 27"-30" |
| RangeKnobCount | 6 |
| APPLIANCE_RANGE_HOOD | Wall Hood |
| APPLIANCE_REFRIGERATOR | Extra Large Built In Refrigerator 42"-48" |
| INTERIOR_TILE | Large Ceramic (6 × 6) |
| CEILING_HEIGHT | Normal (8') |
| CanLightCount | 5 |
| PendantLightCount | 3 |
| SINK | Undermount |
| KICHEN_SINK_SINK | Under mount Kitchen Sink (double bowl) 30"-35" |
| KITCHEN_SINK_FAUCET | Kitchen Faucet Single Handle Style |
| KITCHEN_FEATURE | Breakfast Bar, Island |
| KITCHEN_LAYOUT | U-Shaped |
| INTERIOR_FEATURE | Wine rack |
| WINDOW | Casement |

In various embodiments, the facility uses for each room type or other project type a distinct set of projects attributes that are relevant for that project type. For example, for a bathroom remodeling project, the facility would include project characteristics relating to bathtubs, showers, toilets, etc., without characteristics relating to ovens, ranges, dishwashers, etc.

In step 303, the facility imputes characteristics that are missing among those determined by the visual analysis in step 302. In some embodiments, the facility performs step 303 using a rule based imputation technique an example of rules used by the facility in such a rule based imputation technique in some embodiments is on page 10.

In some embodiments, the facility performs step 303 using a rule-based imputation model such as the one described below in Table 2:

TABLE 2

Sample Project Characteristic Imputation Rules

1. Room size: inflate room size when room percent in view <100% (inflated room square feet) = original room square feet/room in view percent
2. Kitchen appliances - impute microwave, dishwasher, refrigerator and stove whenever they are missing, regardless of room in view percent;
   a. Microwave, dishwasher and refrigerator: impute one of the possible type with multi-class logistic regression
   b. Stove:
      i. rooms without a range: if there is an oven but isn't a burner, impute a burner(cooktop or rangetop): if there is a burner but isn't an oven, impute an oven; if there is neither, impute an oven and a burner for room with expensiveness = 3, impute a range for room with expensiveness = 1 or 2
      ii. rooms with a range: do nothing
   c. Range Knob count: impute count when room in view percent <80%
3. Kitchen sink: impute a sink and/or a faucet whenever missing
4. Kitchen cabinet: if cabinets are present (as indicated by tags), then impute count when room in view percent <80% or when count = 0
5. Kitchen lighting:
   a. can/pendant light count: impute count if tag = 1 and room in view percent <80% or count = 0;
   b. chandelier: if tag = 1 but count = 0, set count = 1
   c. wall sconce/flush: if tag = 1 but count = 0, set count = 2
   d. if sum of light count = 0, do not impute, instead give an average lighting cost based on room size and expensiveness
6. Bathroom: always impute a mirror and/or a sink whenever they are missing
7. Bath/shower:
   a. Impute shower/bath according to room type and expensiveness:
      i. Full/master/kids bathroom: exp = 1,2 - shower bath combo; exp = 3 - shower + bath
      ii. ¾ bath: shower only
      iii. Powder room: no shower/bath
   b. Full/master bathroom with only bathtub: add a shower
   c. Impute type of showerhead/shower door/bathtub with multi-class logistic regression
8. Bathroom lighting imputation: similar to that of kitchen's In some embodiments, the facility performs step 303 using a statistical imputation model. Table 3 below shows one statistical imputation model used by the facility in some embodiments in order to perform step 303:

The facility imputes categorical variables using a multi-class logistic regression model in accordance with, in some embodiments, (see McCullagh P. and Nelder, J. A. (1989) Generalized Linear Models. London: Chapman and Hall. Venables, W. N. and Ripley, B. D. (2002) Modern Applied Statistics with S. New York: Springer, each of which is hereby incorporated by reference in its entirety), where the probability of observation $Y_i$ belong to class k is $$P(Y_i = k) = \frac{\exp(\beta_k X_i)}{\sum_{j=1}^{K} \exp(\beta_j X_i)}$$

TABLE 3

Sample Statistical Imputation Model

1. The variables the facility imputes using the logisitic regression are
   a. Type of feature when the feature is a required attribute
      i. Type of kitchen (U-shape, island, ...)
      ii. Type of bathroom (master, full, ...)
      iii. Style of room (Asian, mid-century modern, ...)
      iv. Et cetera
   b. Type of item when item is required
      i. Type of refrigerator (built-in, double door, ...)
      ii. Type of bathtub (drop-in, claw foot, ...)

TABLE 3-continued

Sample Statistical Imputation Model iii. Type of countertop (marble, granite, ...)
    iv. Et cetera
2. For the following items, the facility imputes the count using a Poisson regression model when the corresponding item exists but count = 0, or room in view percent <80%:
    a. Upper Cabinet
    b. Lower Cabinet
    c. Range Knob
    d. Can Light
    e. Pendant Light in kitchens
3. When the following items exist but the corresponding count is missing, then the facility sets a number:
    a. Chandelier Light: 1
    b. Flush Light: 2
    c. Sconce Light: 2
    d. Pendant Light in bathrooms: 1
4. If the total light count in the room is zero, or none of the light types are tagged, the facility uses a linear model to estimate the electrical cost of the room. This essentially gives the average cost of the room of similar size and expensiveness.

In some embodiments (not shown), after step 303, the facility displays the imputed characteristics in a user interface similar to display 500 shown in FIG. 5 to permit a human editor to override imputed characteristics found to be inaccurate. In some embodiments (not shown), the facility uses a rule-based or statistical model to identify suspicious characteristics determined by the visual analysis process, and flag these for review.

In step 304, the facility obtains a location and a set of costs for this observation project, such as from a contractor, and associates these with the project characteristics determined in step 302 to form an observation to be used to train the model.

Figure 6:
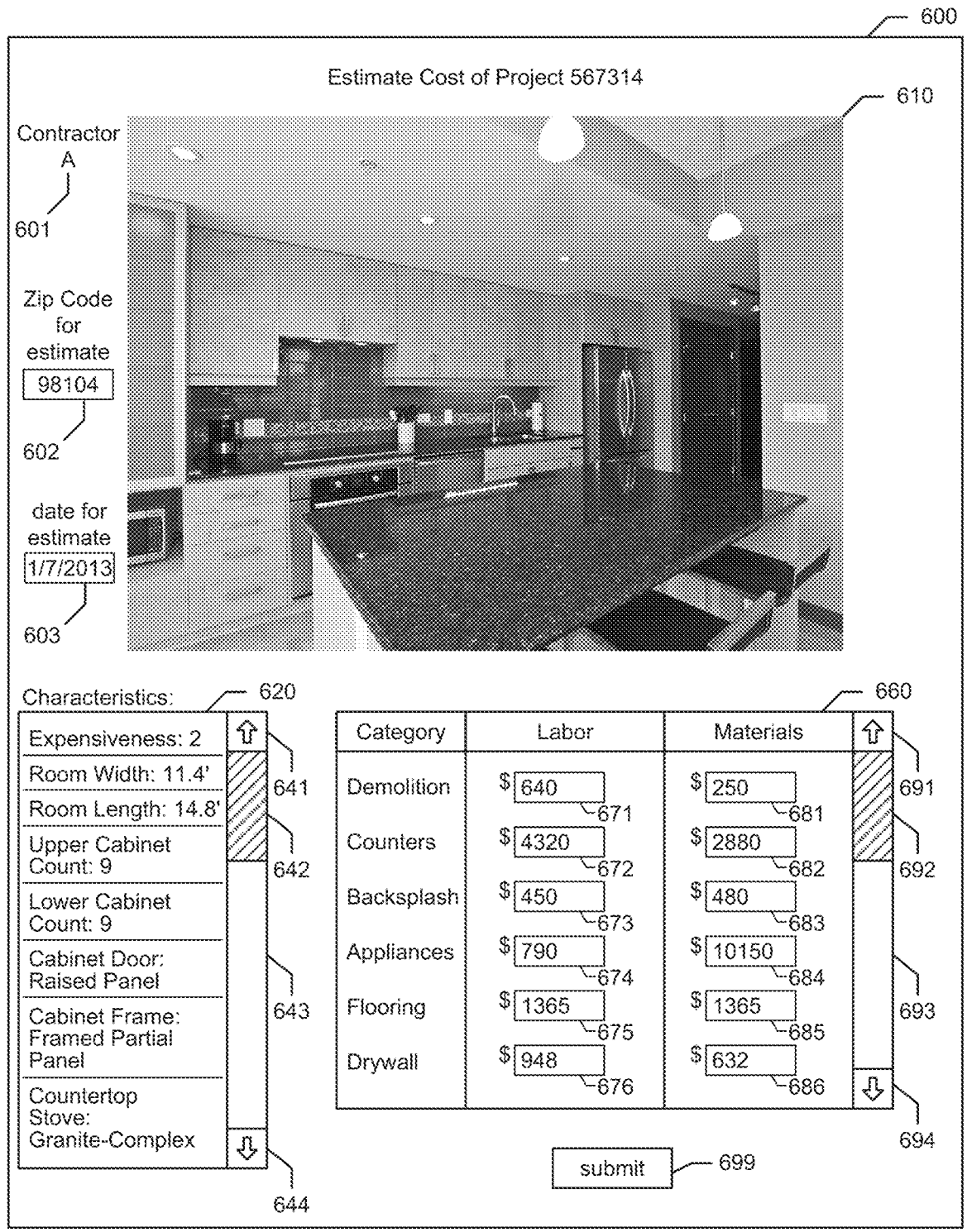
FIG. 6 is a display diagram showing a sample visual user interface presented by the facility in order to obtain a location and a set of costs for an observation project, such as from a contractor.

FIG. 6 is a display diagram showing a sample visual user interface presented by the facility in order to obtain a location and a set of costs for an observation project, such as from a contractor. The display 600 includes a photograph 610 depicting the finished state of the project whose cost is being estimated. It further identifies a contractor 601 who is providing the estimate. It includes a text entry field 602 for entering information about the location for which the user is estimating the project, such as zip code or other information identifying a geographic location, and a text entry field 603 for entering timing information for which the user is estimating the project, such as a date. The display further includes an area 620 showing characteristics that have been attributed to the project, such as on the basis of the visual information in the photograph. The contents of this area can be scrolled using scrolling controls 641-644. The display further includes an estimate area 660. The estimate area 660 includes a number of categories of the project for which the user is to estimate both a labor cost and a materials cost. For example, the user would enter a labor cost for the counters category into text entry field 672, and a materials cost for the counters category into text entry field 682. In some embodiments, for at least certain categories, the user is prompted to add a per-unit cost for the category rather than an overall cost for the category. For example, where, as here, the project involves installing nine upper cabinets and nine lower cabinets, the user interface may indicate for a cabinets category that labor and materials costs should be estimated for each of the 18 cabinets, rather than across all 18 cabinets. In some cases, this enables the model to generalize costs in such categories from observations having certain counts of the relevant feature to projects to be estimated having different counts. The user may use scrolling controls 691-694 to scroll the estimate area and display all of the text entry fields in corresponding categories, and enter an estimated cost into each text entry field. After doing so, the user operates a submit button 699 in order to associate the entered geographic location and cost information with the observation project.

In some embodiments, the facility solicits estimates for the same observation project from a number of different users, such as different contractors. FIG. 7 is a table diagram showing estimates performed by different contractors for different aspects of a project to be used as an observation to train the facility's model. The table 700 is made up of rows such as rows 701-706, each corresponding to a different category of a remodeling project. For example, row 701 corresponds to the demolition phase of the project, where existing contents of the room are removed, such as down to the studs and subfloor, while row 702 corresponds to purchasing materials for and constructing counters as part of the project. Each of the rows is divided into the following columns: a category column indicating the category whose cost is estimated by each contractor; and, for each of the four contractors providing estimates, a labor column (column 712, 714, 716, and 718) specifying the cost of labor predicted to be required for the category to which the row corresponds, as well as a materials column (column 713, 715, 717, and 719) indicating the cost of materials expected to be required to perform the category of the project to which the row corresponds. For example, the contents of row 702 indicate that, for the counters category of the project depicted in Table 700, contractor A estimates the labor cost to be $4,320 and the materials cost to be $2,880; contractor B estimates the labor cost to be $2,052 and the materials cost to be $1,368; contractor C estimates the labor cost to be $1,980 and the materials cost to be $1,320; and contractor D estimates the labor cost to be $918 and the material cost to be $612.

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Returning to FIG. 3, in some embodiments (not shown), the facility uses a rule-based or statistical model to identify any cost numbers obtained in step 304 that have suspicious values, such as zero values, values that deviate too much from a median value, etc. and flag these for review and possible correction. After step 304, the facility continues in step 301 to form additional observations for training the model. Once an adequate number of observations have been obtained, the facility continues in step 305 to train the model. In some embodiments, the facility trains a separate model for each of a number of different project types, such as kitchen remodels, bathroom remodels, landscaping projects, foyer remodels, living room remodels, bedroom remodels, swimming pool installations, etc. Each such model is trained using observations of the relevant project type, and is used to estimate the cost of proposed projects of the same type.

In step 305, the facility trains the model using the observations formed in step 304. In some embodiments, the model uses a formulation of project costs as shown below in equation (1):

$$C_{ij} = \left( \sum_{k=1}^{K} (\theta_{k,g} L_{k,ij} + \phi_{k,g} M_{k,ij}) \right) \cdot (\text{Overhead} + \text{Tax}) + \text{Permit} \quad (1)$$

i=project
j=contractor
k=category
g=location
$L_{k,ij}$=cost of labor broken down by category
$M_{k,ij}$=cost of materials broken down by category
$\theta_{k,g}, \phi_{k,g}$=cost adjustment factors for different geographies
Overhead=contractor's markup rate
Tax=tax rate
Permit=permitting cost In various embodiments, the facility uses statistical models of a variety of types including non-parametric regression models, linear models, tree models, spline models, and random-effect models. Model types used by the facility in some embodiments are described in one or more of the following documents, which are hereby incorporated by reference in their entirety: Laird, N. M. and Ware, J. H. (1982) "Random-Effects Models for Longitudinal Data," Biometrics, 38, 963-974; and Pinheiro, J. C., and Bates, D. M. (2000) "Mixed-Effects Models in S and S-PLUS," Springer.

In some embodiments, the facility uses equation (2) below as the basis for its project cost model:

$$\log(X_{k,ij}) = \mu_k + \gamma_{k,j} + \sum_{q=1}^{3} \alpha_{k,q} I[Q_i = q] + \beta_k f(SIZE_i) + \sum_{p=1}^{P} \sum_{a \in A_p} \eta_{p,a} C_{p,ai} + \varepsilon_{k,ij} \quad (2)$$

Input Data
$X_{k,ij}$=$L_{k,ij}$ or $M_{k,ij}$ (labor/materials cost)
$SIZE_i$=width & length
$Q_i$=measure of quality (1, 2, or 3)
$A_p$=set of attributes of category p
$C_{p,ai}$=count of items with attribute "a"
Parameters
$\mu_k$=mean cost
$\gamma_{k,j}$=contractor bias
$\alpha_{k,q}$=quality coefficients
$\beta_k$=size coefficients
$\eta_{p,a}$=count coefficients
$\varepsilon_{k,ij}$=model error In particular, the facility fits this equation to determine values for the parameters listed above across the dimensions of project (i), contractor (j), and category (k) over training observations that each provide a set of the values identified as input data above.

Figure 8:
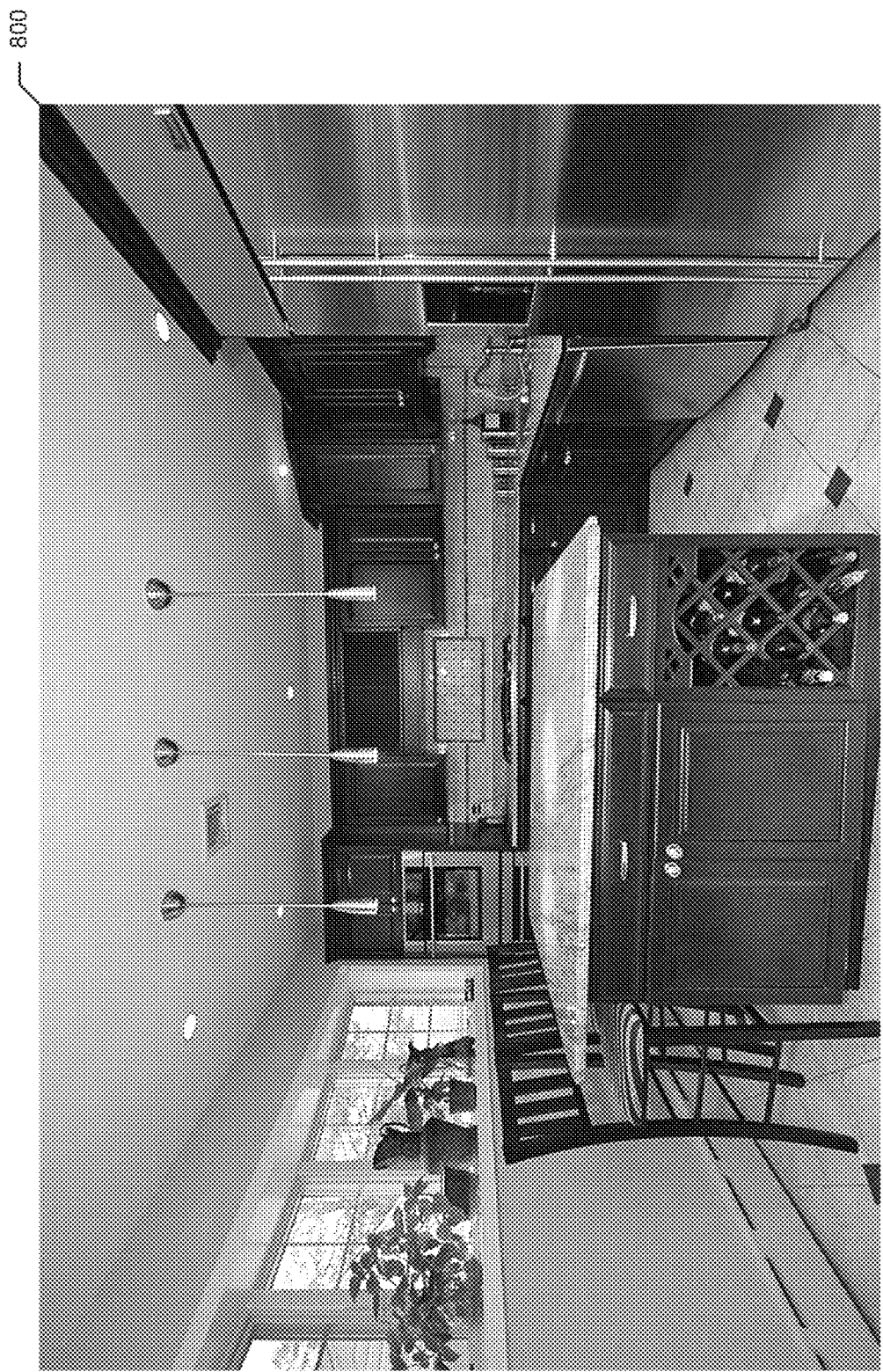
FIG. 8 is an image diagram showing a sample photo illustrating the finished state of a proposed project whose cost is to be estimated.

Returning to FIG. 3, in step 306, the facility obtains a photo, location, and date of a proposed project whose cost is to be estimated. FIG. 8 is an image diagram showing a sample photo illustrating the finished state of a proposed project whose cost is to be estimated. From photo 800, characteristics of the project whose cost is to be estimated can be visually discerned.

Returning to FIG. 3, in step 307, the facility performs a visual analysis process identical or similar to the one performed in step 302 in order to determine project characteristics from the photo obtained in step 306. In step 308, the facility imputes characteristics that are missing among those determined by the visual analysis in step 307 in a manner similar to the characteristic imputation performed by the facility in step 303. In some embodiments, after step 308 (not shown), the facility displays the imputed characteristics in a user interface similar to display 500 shown in FIG. 5 to permit a human editor to override imputed characteristics found to be inaccurate. In some embodiments (not shown), the facility uses a rule-based or statistical model to identify suspicious characteristics determined by the visual analysis process, and flag these for review.

Table 4 below shows a complete sample set of characteristics attributed to a project whose cost is to be estimated whose end result is shown in FIG. 8, subsequent to value imputation in step 308.

TABLE 4

Attribute values for project to be estimated

| Attribute | attribute value |
|---|---|
| Expensiveness | 2 |
| RoomWidth | 9.841 |
| RoomLength | 13.121 |
| UpperCabinetCount | 10 |
| LowerCabinetCount | 5 |
| CABINET_DOOR | European |
| CABINET FRAME | Flush |
| COUNTERTOP_STONE | Granite-simple, Soapstone |
| BACKSPLASH_HEIGHT | Full |
| BACKSPLASH_TILE | Glass |
| APPLIANCE_DISHWASHER | Dishwasher 24" |
| APPLIANCE_MICROWAVE | Built-In Microwave |
| APPLIANCE_BURNER | Electric Cook top 30" |
| APPLIANCE_OVEN | Single Wall Oven 27"-30" |
| RangeKnobCount | 2 |
| APPLIANCE_RANGE_HOOD | |
| APPLIANCE_REFRIGERATOR | Freestanding Full Size Top Freezer Refrigerator |
| INTERIOR_TILE | |
| CEILING_HEIGHT | Normal (8') |
| CanLightCount | 4 |
| PendantLightCount | 2 |
| SINK | Undermount |
| KICHEN_SINK_SINK | Under mount Kitchen Sink (double bowl) 30"-35" |
| KITCHEN_SINK_FAUCET | Kitchen Faucet |
| Single Handle Style | |
| KITCHEN FEATURE | Breakfast Bar, Island |
| KITCHEN LAYOUT | One-wall |
| INTERIOR_FEATURE | |
| WINDOW | |

In step 309, the facility applies the model trained in step 305 to the project characteristics determined in step 307 as well as the location and date obtained in step 306 in order to obtain an estimated cost for the proposed project. In some embodiments, this involves evaluating equation (2) across each of the following dimensions: labor and materials; contractor identity; and labor category. For each combination of labor or materials and category, equation (2) produces a set of estimated costs, each of which corresponds to a different contractor. The facility aggregates across these contractor costs for each combination of labor or materials and category, in some cases weighting each contractor's cost within the average using a weighting factor, such as a weighting factor reflecting the number of projects for which each contractor has provided an estimate. This produces a single aggregated estimated cost for each combination of labor or materials and category. In various embodiments, the facility displays this rectangular array of estimated costs individually; aggregates across labor and materials; aggregates across categories; and/or aggregates to a single total cost number for the entire project.

Figure 9:
FIG. 9 is a display diagram showing a sample visual user interface used by the facility in some embodiments to present the results of cost estimation for a proposed project.

In step 310, the facility stores and/or outputs the estimated cost obtained in step 309. FIG. 9 is a display diagram showing a sample visual user interface used by the facility in some embodiments to present the results of cost estimation for a proposed project. In various embodiments, the facility presents displays such as the one shown in FIG. 9 in web pages, mobile or desktop applications, or a variety of other contexts. The display 900 includes a photo 910 depicting the end result of the proposed project. It also shows an indication of the geographic location 902 for which the cost of the project is estimated, and an indication of the date 903 for which the cost of the project is estimated. The display further includes a table 920 that shows the amount estimated for each labor and materials for each category of the project, as well as totals by category, and across categories for each of labor and materials. Finally, the display includes a grand total 930 of the entire cost for the project. In various embodiments, the facility includes additional information not here shown, including ranges such as confidence intervals around some or all of the values shown. In some embodiments, the user can interact with some or all of the values shown, such as by selecting them to display additional information about the nature of the value, the basis for determining the value, etc. In some embodiments, the user can interact with the indication 902 of geographic location in order to alter the geographic location and re-estimate the cost of the project for the new geographic location, and/or interact with the indication 903 of the date in order to alter the date and re-estimate the cost of the project for the new date. After step 310, the facility continues in step 306 to estimate the cost of another proposed project.

Those skilled in the art will appreciate that the steps shown in FIG. 3 may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

In some embodiments, the facility detects changes in the data on which the model is based; such as changes to the characteristics and/or estimated cost of existing observation projects, the addition of new observation projects, etc. In response, the facility automatically retrains the model using the new data.

In some embodiments, the facility detects when the nature of the model is changed, such as by adding new variables. In response, the facility automatically retrains the changed model using available training data.

In some embodiments, after estimating the cost of a proposed project, the facility determines that a basis for this estimation has changed. For example, the facility may detect that the model used to generate the estimate for the project has changed, or that a characteristic of the product has been revised, such as by a human editor, or by a new version of an automatic computer vision system. In response, the facility automatically determines a new cost estimate for the project based upon current data.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method, performed by a computing system having one or more instances of computer-readable media and a processor, for generating characteristics of remodeling projects, the method comprising:

receiving a multiplicity of photographs, each photograph depicting the results of a remodeling project, a first plurality of the multiplicity of photographs depicting the results of remodeling projects whose cost is to be estimated directly by a contractor for use in training a remodeling project cost model, a second plurality of the multiplicity of photographs that is distinct from the first plurality of the multiplicity of photographs depicting the results of remodeling projects whose cost is to be estimated by the trained remodeling project cost model; and subjecting all of the received multiplicity of photographs to the same visual analysis process in order to, for each received photograph, identify characteristics of the remodeling project whose results are depicted by the photograph.

2. The method of claim 1, wherein the visual analysis process to which all of the received multiplicity of photographs is subjected comprises a computer vision component that automatically recognizes project characteristics from each photograph.

3. The method of claim 1, wherein the visual analysis process to which all of the received multiplicity of photographs is subjected comprises providing a user interface via which a human editor inputs project characteristics manually discerned from each photograph.

4. The method of claim 1, wherein the visual analysis process to which a selected one of the received multiplicity of photographs is subjected comprises providing a user interface via which a user who uploaded the selected photograph inputs project characteristics.

5. The method of claim 1, further comprising:

for each set of characteristics identified for a received photograph by the visual analysis process, subjecting the identified characteristics to a characteristic imputation model configured to attribute characteristics to the remodeling project depicted by the photograph that were not identified by the visual analysis process.

6. The method of claim 1, wherein the one or more instances of computer-readable media collectively store a remodeling project characteristic data structure, the remodeling project characteristic data structure comprising a multiplicity of entries, each entry having been produced by performing the same visual analysis to a different one of the multiplicity of photographs depicting the results of a remodeling project, a first plurality of the multiplicity of entries each specifying characteristics of a remodeling project whose cost is to be estimated directly by a contractor for use in training the remodeling project cost model, a second plurality of the multiplicity of entries that is distinct from the first plurality of the multiplicity of entries each specifying characteristics of a remodeling project whose cost is to be estimated by the trained remodeling project cost model, such that the first plurality of entries may be used to train the remodeling project cost model, and the trained remodeling project cost model may be applied to the second plurality of entries to estimate the cost of performing the corresponding remodeling project.

7. The method of claim 1, wherein the one or more instances of computer-readable media collectively store a remodeling project cost observations data structure, the remodeling project cost observations data structure comprising a multiplicity of entries, each entry comprising data indicating:
   characteristics of a remodeling project; and
   a cost estimated for the remodeling project directly by a contractor,
such that the entries may be used to train the remodeling project cost model.

8. The method of claim 1, wherein the one or more instances of computer-readable media collectively store a trained remodeling project cost model data structure, the trained remodeling project cost model data structure comprising a trained remodeling project cost model that is configured to predict the cost of remodeling projects based upon characteristics of the remodeling projects,
   such that the cost of a distinguished remodeling project can be predicted by applying the trained remodeling project cost model to characteristics of the distinguished remodeling project.

9. The method of claim 1, further comprising:
   accessing a plurality of observations, each observation identifying characteristics of a remodeling project and a cost for performing the remodeling project determine manually at least in part based upon the identified characteristics; and
   fitting a trained remodeling project cost model that predicts project cost based upon project characteristics using the accessed observations, the trained remodeling project cost model predicting a cost of performing a remodeling project based upon characteristics of the remodeling project.

10. The method of claim 9, further comprising:
   accessing the trained remodeling project cost model that predicts project cost based upon project characteristics;
   applying the accessed trained remodeling project cost model to characteristics of a distinguished project to obtain an estimated cost; and
   causing the obtained estimated cost to be displayed.

11. One or more instances of computer-readable media collectively storing a remodeling project characteristic data structure, the remodeling project characteristic data structure comprising a multiplicity of entries, each entry having been produced by performing the same visual analysis to a different one of a multiplicity of photographs depicting the results of a remodeling project, a first plurality of the multiplicity of entries each specifying characteristics of a remodeling project whose cost is to be estimated directly by a contractor for use in training a remodeling project cost model, a second plurality of the multiplicity of entries that is distinct from the first plurality of the multiplicity of entries each specifying characteristics of a remodeling project whose cost is to be estimated by the trained remodeling project cost model,
   such that the first plurality of entries may be used to train the remodeling project cost model, and the trained remodeling project cost model may be applied to the second plurality of entries to estimate the cost of performing the corresponding remodeling project.

12. The instances of computer-readable media of claim 11, wherein the first plurality of the multiplicity of entries includes an entry that specifies a characteristic of a remodeling project that was imputed based upon other characteristics of the remodeling project after not being specified by the visual analysis.

13. The instances of computer-readable media of claim 11, wherein the second plurality of the multiplicity of entries includes an entry that specifies a characteristic of a remodeling project that was imputed based upon other characteristics of the remodeling project after not being specified by the visual analysis.

14. One or more instances of computer-readable media collectively having contents capable of causing a computing system to perform a method for estimating the cost of a remodeling project, the method comprising:
   accessing a project cost model that predicts project cost based upon project characteristics;
   applying the accessed project cost model to characteristics of a distinguished project to obtain an estimated cost; and
   causing the obtained estimated cost to be displayed.

15. The instances of computer-readable media of claim 14, further comprising causing to be displayed together with the obtained estimated cost at least a portion of the project characteristics.

16. The instances of computer-readable media of claim 14, further comprising:
   accessing a photograph depicting a completed version of the distinguished project; and
   subjecting the accessed photograph to a visual analysis process that discerns the characteristics of the distinguished project to which the accessed project cost model is applied.

17. The instances of computer-readable media of claim 16, further comprising causing the accessed photograph to be displayed together with the obtained estimated cost.

18. The instances of computer-readable media of claim 14 wherein applying the accessed project cost model to characteristics of the distinguished project comprises:
   for each of a plurality of contractors, applying a different submodel of the accessed project cost model to predict a cost that would be estimated for the distinguished project by the contractor; and
   combining the costs predicted for the contractors in order to obtain an estimated cost for the distinguished project.

19. The instances of computer-readable media of claim 18, further comprising:
   determining a basis for weighting the contractors of the plurality; and
   before combining the costs predicted for the contractors, weighting the costs predicted for the contractors in accordance with the determined basis for weighting the corresponding contractors.

20. A method, performed by a computing system having at least one memory and at least one processor, for generating characteristics of a remodeling project, the method comprising:
   accessing a project cost model that predicts project cost based upon project characteristics;
   applying the accessed project cost model to characteristics of a distinguished project to obtain an estimated cost; and
   causing the obtained estimated cost to be displayed.

21. The method of claim 20, further comprising causing to be displayed together with the obtained estimated cost at least a portion of the project characteristics.

22. The method of claim 21, further comprising:
   accessing a photograph depicting a completed version of the distinguished project; and
   subjecting the accessed photograph to a visual analysis process that discerns the characteristics of the distinguished project to which the accessed project cost model is applied.

23. The method of claim 22, further comprising:
causing the accessed photograph to be displayed together with the obtained estimated cost.

24. The method of claim 21 wherein applying the accessed project cost model to characteristics of the distinguished project comprises:
for each of a plurality of contractors, applying a different submodel of the accessed project cost model to predict a cost that would be estimated for the project by the contractor; and
combining the costs predicted for the contractors in order to obtain an estimated cost for the distinguished project.

25. The method of claim 24, further comprising:
determining a basis for weighting each of the contractors of the plurality of contractors; and
before combining the costs predicted for the contractors, weighting the costs predicted for the contractors in accordance with the determined basis for weighting the corresponding contractors.

26. The method of claim 20, wherein the project cost model is at least one of a non-parametric regression model, a linear model, a tree model, a spline model, a random-effects model, a Gaussian process, or any combination thereof.

27. A computing system for generating characteristics of remodeling projects, the computing system comprising:
one or more processors;
one or more memories;
a component configured to receive a multiplicity of photographs, each photograph depicting the results of a remodeling project, a first plurality of the multiplicity of photographs depicting the results of remodeling projects whose cost is to be estimated directly by a contractor for use in training a remodeling project cost model, a second plurality of the multiplicity of photographs that is distinct from the first plurality of the multiplicity of photographs depicting the results of remodeling projects whose cost is to be estimated by the trained remodeling project cost model; and
a component configured to subject all of the received multiplicity of photographs to the same visual analysis process in order to, for each received photograph, identify characteristics of the remodeling project whose results are depicted by the photograph,
wherein each of the components comprises computer-executable instructions stored in the one or more memories for execution by the computing system.

28. The computing system of claim 27, wherein the visual analysis process to which all of the received multiplicity of photographs is subjected comprises providing a user interface via which a human editor inputs project characteristics manually discerned from each photograph.

29. The computing system of claim 27, wherein the one or more memories collectively store a trained remodeling project cost model data structure, the trained remodeling project cost model data structure comprising the trained remodeling project cost model, wherein the trained remodeling project cost model is configured to predict the cost of remodeling projects based upon characteristics of the remodeling projects,
such that the cost of a distinguished remodeling project can be predicted by applying the trained remodeling project cost model to characteristics of the distinguished remodeling project.

30. The computing system of claim 29, further comprising:
a component configured to access a plurality of observations, each observation identifying characteristics of a remodeling project and a cost for performing the remodeling project determined at least in part based upon the identified characteristics; and
a component configured to fit the trained remodeling project cost model that predicts project cost based upon project characteristics using the accessed observations, the trained remodeling project cost model predicting a cost of performing a remodeling project based upon characteristics of the remodeling project.

31. The computing system of claim 27, wherein the one or more memories collectively store a remodeling project cost observations data structure, the remodeling project cost observations data structure comprising a multiplicity of entries, each entry comprising data indicating:
characteristics of a remodeling project; and
a cost estimated for the remodeling project directly by a contractor,
such that the entries may be used to train the remodeling project cost model.

32. The computing system of claim 27, wherein the visual analysis process to which all of the received multiplicity of photographs is subjected comprises a computer vision component that automatically recognizes project characteristics from each photograph.

33. The computing system of claim 27, further comprising:
a component configured to access the trained remodeling project cost model that predicts project cost based upon project characteristics;
a component configured to apply the accessed trained remodeling project cost model to characteristics of a distinguished project to obtain an estimated cost; and
a component configured to cause the obtained estimated cost to be displayed.

34. The computing system of claim 27, wherein the one or more memories collectively store a remodeling project characteristic data structure, the remodeling project characteristic data structure comprising a multiplicity of entries, each entry having been produced by performing the same visual analysis to a different one of the multiplicity of photographs depicting the results of a remodeling project, a first plurality of the multiplicity of entries each specifying characteristics of a remodeling project whose cost is to be estimated directly by a contractor for use in training the remodeling project cost model, a second plurality of the multiplicity of entries that is distinct from the first plurality of the multiplicity of entries each specifying characteristics of a remodeling project whose cost is to be estimated by the trained remodeling project cost model,
such that the first plurality of entries may be used to train the remodeling project cost model, and the trained remodeling project cost model may be applied to the second plurality of entries to estimate the cost of performing the corresponding remodeling project.

35. The computing system of claim 27, further comprising:
a component configured to, for each set of characteristics identified for a received photograph by the visual analysis process, subject the identified characteristics to a characteristic imputation model configured to attribute characteristics to the remodeling project depicted by the photograph that were not identified by the visual analysis process.

36. The computing system of claim 27, wherein the one or more memories collectively store a remodeling project cost observations data structure, the remodeling project cost observations data structure comprising a multiplicity of entries, each entry comprising data indicating:
  characteristics of a remodeling project; and
  a cost estimated for the remodeling project directly by a contractor,
such that the entries may be used to train the remodeling project cost model.

37. The computing system of claim 27, wherein the visual analysis process to which a selected one of the received multiplicity of photographs is subjected comprises providing a user interface via which a user who uploaded the selected photograph inputs project characteristics.

38. The method of claim 1, wherein the remodeling project cost model is a non-parametric regression model.

39. The method of claim 1, wherein the remodeling project cost model is a linear model.

40. The method of claim 1, wherein the remodeling project cost model is a tree model.

41. The method of claim 1, wherein the remodeling project cost model is a spline model.

42. The method of claim 1, wherein the remodeling project cost model is a random-effects model.

43. The method of claim 1, wherein the remodeling project cost model is a Gaussian process.

44. The method of claim 9, wherein each of the accessed plurality of observations specifies a plurality of component costs each manually estimated for a different aspect of the remodeling project.

45. A computing system for estimating the cost of a remodeling project, the computing system comprising:
  a component configured to access a project cost model that predicts project cost based upon project characteristics;
  a component configured to apply the accessed project cost model to characteristics of a distinguished project to obtain an estimated cost.

46. The computing system of claim 45, further comprising causing to be displayed together with the obtained estimated cost at least a portion of the project characteristics.

47. The computing system of claim 45, further comprising:
  accessing a photograph depicting a completed version of the distinguished project; and
  subjecting the accessed photograph to a visual analysis process that discerns the characteristics of the distinguished project to which the accessed project cost model is applied.

48. The computing system of claim 47, further comprising causing the accessed photograph to be displayed together with the obtained estimated cost.

49. The computing system of claim 45 wherein applying the accessed project cost model to characteristics of the distinguished project comprises:
  for each of a plurality of contractors, applying a different submodel of the accessed project cost model to predict a cost that would be estimated for the distinguished project by the contractor;
  combining the costs predicted for the contractors in order to obtain an estimated cost for the distinguished project;
  determining a basis for weighting the contractors of the plurality; and
  before combining the costs predicted for the contractors, weighting the costs predicted for the contractors in accordance with the determined basis for weighting the corresponding contractors.

\* \* \* \* \*